United States Patent

Chen et al.

[11] Patent Number: 6,095,226
[45] Date of Patent: Aug. 1, 2000

[54] STRUCTURE MULTIPURPOSE PARTITION

[76] Inventors: Hong-Jen Chen, 36, Alley 756, Lane 1, Shi Tsuoh Village, Shi Chou Shiang, Changhua; Ming Yao Yao, 93, Tai-Pin Rd., Taichung; Chung Hsien Lee, 91, Long Fung Lane, Fu Liau Li, Tsao Twen Township, Nan Tour, all of Taiwan

[21] Appl. No.: 09/227,547

[22] Filed: Jan. 11, 1999

[51] Int. Cl.[7] .................................................. A47G 5/00
[52] U.S. Cl. .......................... 160/135; 40/733; 160/180
[58] Field of Search .................................. 160/135, 351, 160/116, 180, 184, 353; 40/658, 611, 733, 723, 747, 764, 765, 779, 513, 497, 492; 211/169, 41.12, 47, 163

[56] References Cited

U.S. PATENT DOCUMENTS

| | | | |
|---|---|---|---|
| 437,016 | 9/1890 | Byrnes | 160/135 |
| 950,912 | 3/1910 | Harrington . | |
| 1,914,068 | 6/1933 | Birnn | 40/764 |
| 2,406,729 | 8/1946 | White et al. | 160/135 |
| 2,454,648 | 11/1948 | Green | 40/747 |
| 2,938,248 | 5/1960 | Hadary | 160/351 |
| 3,466,777 | 9/1969 | Wistrand | 40/611 |
| 3,529,374 | 9/1970 | Spertus | 40/733 |
| 3,962,827 | 6/1976 | Chaffee | 160/135 |
| 3,982,633 | 9/1976 | Pennington | 211/169 |
| 4,063,377 | 12/1977 | Hukill | 40/492 |
| 5,058,300 | 10/1991 | Ernest et al. | 40/611 |
| 5,280,840 | 1/1994 | Terpening | 211/169 |
| 5,471,347 | 11/1995 | Galiani | 40/747 |
| 5,544,436 | 8/1996 | Lefkowitz | 40/497 |

*Primary Examiner*—Blair M. Johnson
*Attorney, Agent, or Firm*—Smith, Gambrell & Russell, LLP

[57] ABSTRACT

The invention relates to a kind of improved structure multifunction partition, specifically referring to a kind of structure offering an innovative improvement over shortcomings, such as uninteresting and monotonous features, of conventional partitions and which consists of partition units having a number of pivot openings of predetermined dimension and rotating mounts at the center of the interior sides of the top and bottom ends. The rotating mounts are capable of holding interchangeable photographs, pictures, compact disks (CD), or optical disks which thereby allows the user to switch or change photographs or rotate to replace the background, or to display compact disks (CD) or optical disks, which demonstrates the enhanced function of the partition structure in terms of practical application.

3 Claims, 4 Drawing Sheets

STRUCTURE MULTIPURPOSE PARTITION

BACKGROUND OF THE INVENTION

Partitions that provide for interior room dividing and covering off are commonly constructed of wood panels or fabric to achieve partitioning functions.

Although conventional partitions are capable of the aforesaid dividing and covering off functions, the structural design is not fully optimized. In view of the shortcomings of such conventional partitions, the inventor of the invention herein, based on many years of experience in the field, conducted extensive research and development to innovate a progressive improvement that culminated in the structure of the invention herein, which is hereby submitted in application for the granting of the commensurate patent rights.

SUMMARY OF THE INVENTION

The primary objective of the invention herein to provide a kind of partition that has enhanced function in terms of practical application that mainly consists of partition units having a number of pivot openings of predetermined dimension and rotating mounts at the center of the interior sides of the top and bottom ends, and the rotating mounts are capable of holding interchangeable photographs, pictures, compact disks (CD), or optical disks which thereby allows the user to switch or change photographs or rotate to replace the background, or to display compact disks (CD) or optical disks, which demonstrates the enhanced function of the partition structure in terms of practical application.

To enable a further understanding of the structure and innovations of the invention herein, the brief description of the drawings below are followed by the detailed description of the invention herein.

PARTS OF THE DRAWINGS

10-Partition unit.
20-Rotating mount.
21-Mount support slot.
30-Transparent pane.
40-Hinge.
50-Hole.
60-Split post.

DETAILED DESCRIPTION OF THE INVENTION

Figure 1:
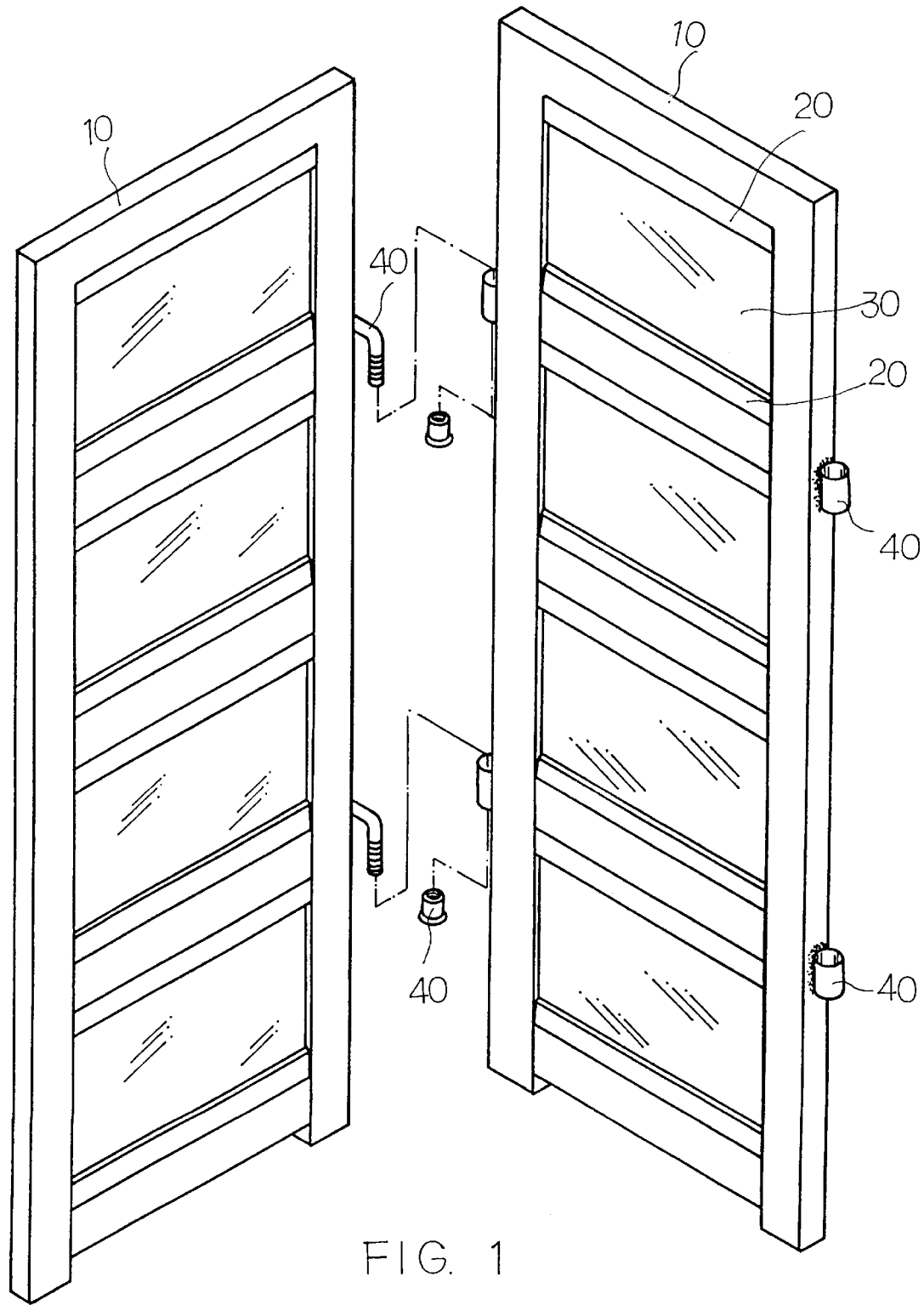
FIG. 1 is an isometric drawing of the preferred embodiment of the invention herein.
Figure 2:
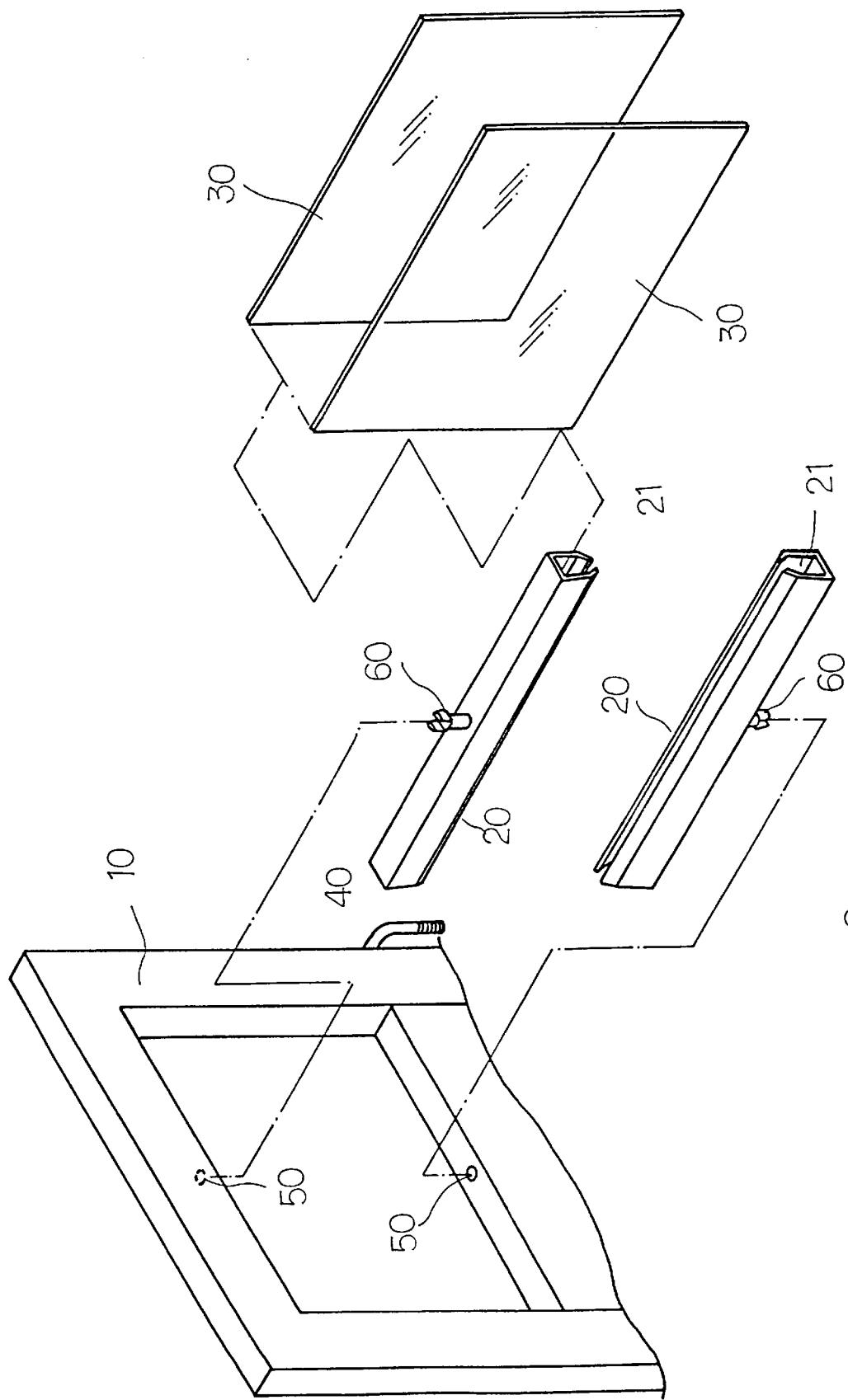
FIG. 2 is an exploded drawing of the preferred embodiment of the invention herein.
Figure 3:
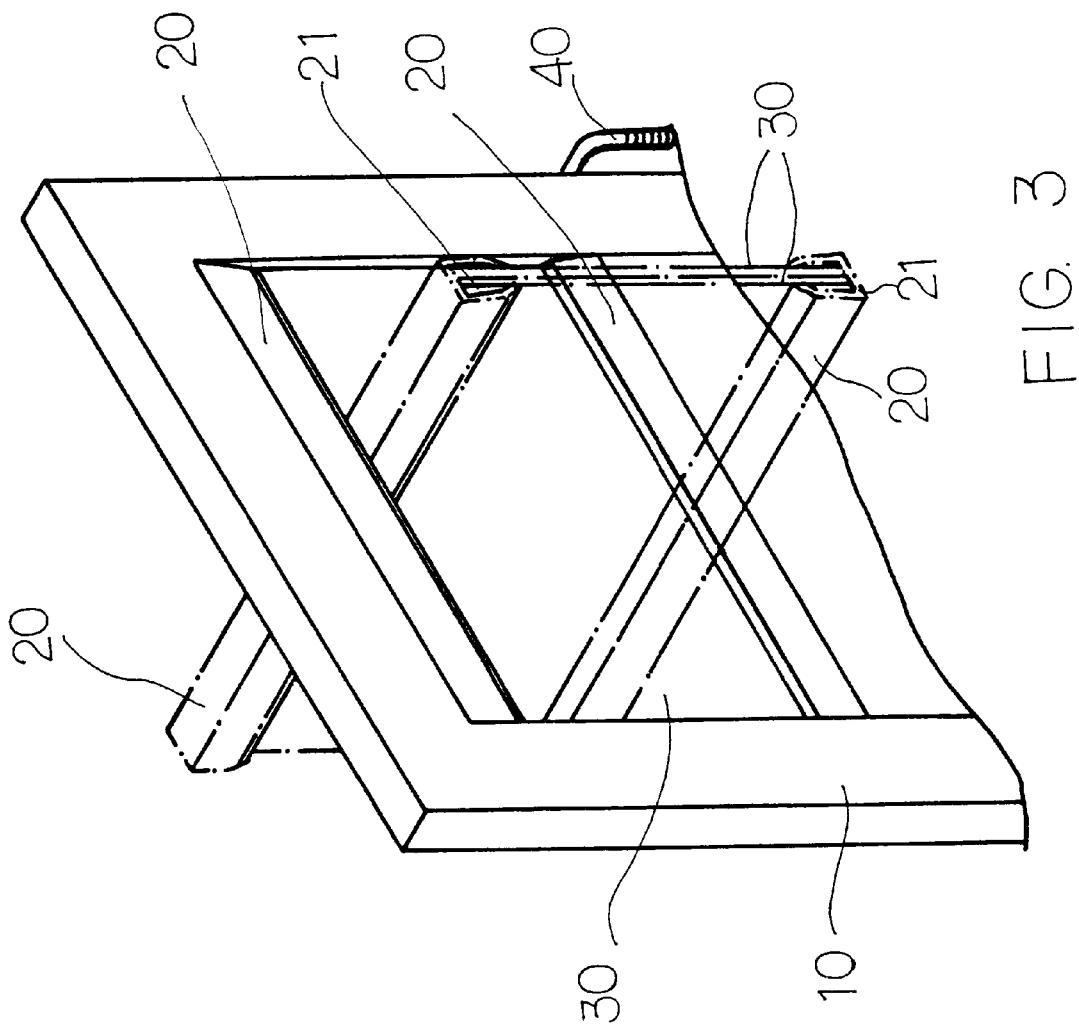
FIG. 3 is an isometric drawing of the invention herein depicting the operation of the rotating mount.
Figure 4:
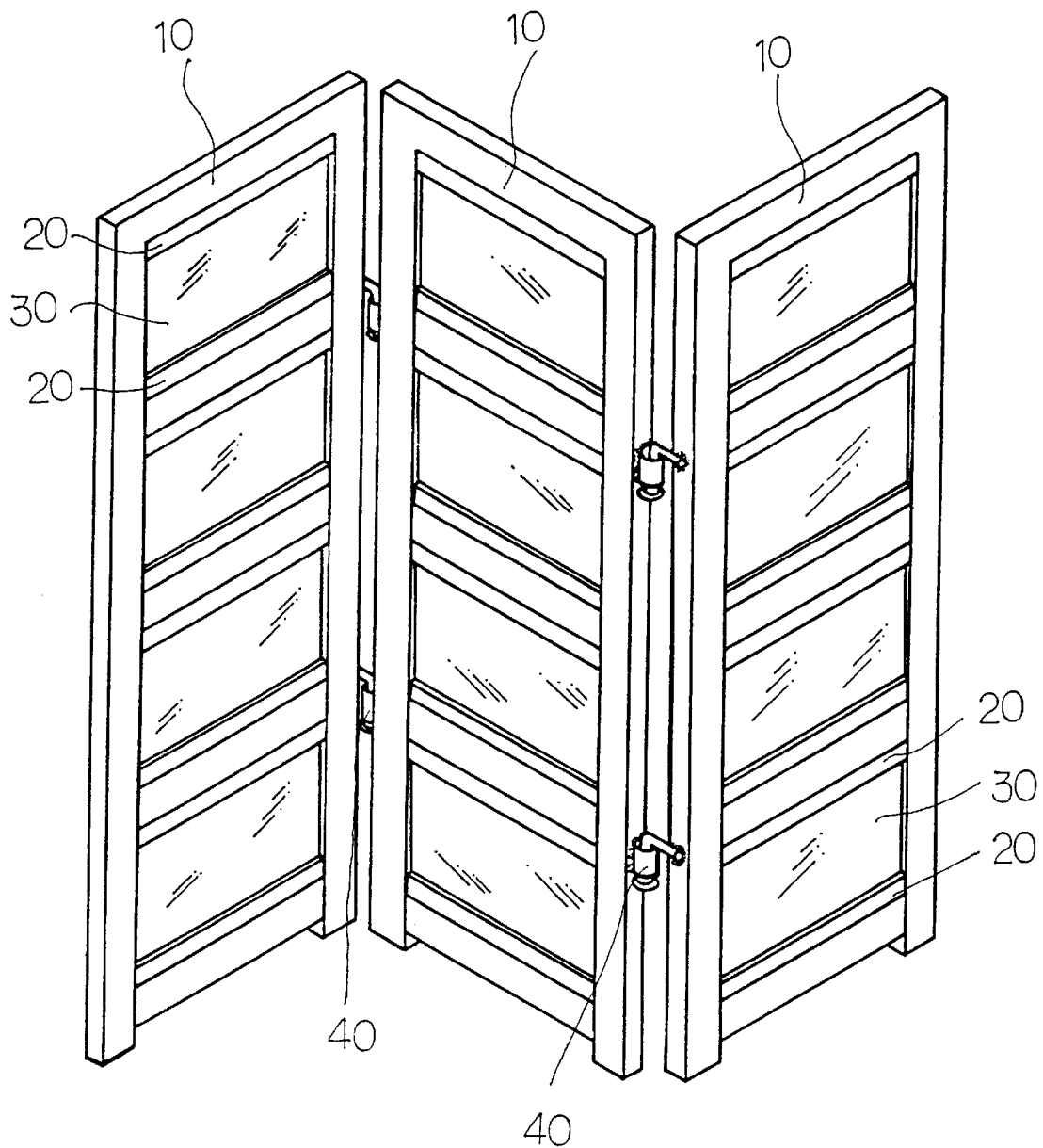
FIG. 4 is an isometric drawing of the preferred embodiment of the invention herein.

The invention herein is mainly comprised of a partition unit (10), a number of rotating mounts (20), and a number of transparent panes (30), and there are hinges (40) positioned on the side of each aforesaid partition unit (10) that provides for the linking together of two partition units (10) [as indicated in FIG. 1]; at the center of the interior sides of the top and bottom ends of the aforesaid partition unit (10) are a number of pivot openings of predetermined dimensions with holes (50) provided for inserting the split posts (60) of the rotating mounts (20); the aforesaid rotating mounts (20) are U-shaped to provide mounting support, with the ascending walls formed by the U-shape contour providing the means for clamping the transparent panes (30) [as indicated in FIG. 2] such that each pair of transparent panes (30) is capable of holding interchangeably photographs, pictures, compact disks (CD), or optical disks which thereby allows the user to switch or change photographs or rotate to replace the background, or to display CD disks or optical disks, which demonstrates the enhanced function of the partition structure in terms of practical application.

In summation of the foregoing section, the invention herein effectively enhances the performance of the partition structure, while also ensuring greater utilitarian value.

Therefore, the invention herein in terms of utility, function, and innovative structure meets new patent requirements and is hereby submitted in application for the granting of the commensurate patent rights.

What is claimed is:

1. A structural multipurpose partition that is comprised of a partition unit, a number of rotating mounts, and a number of transparent panes, and there are hinges positioned on a side of the aforesaid partition unit that provides for the linking together of two aforesaid partition units; the aforesaid partition unit contains interior top sides and interior bottom sides, and each rotating mount has a split post about which the rotating mount rotates; at the center of the interior top and bottom sides of the aforesaid partition unit are respective pivot openings of predetermined dimensions with holes provided for insertion of the split posts of the aforesaid rotating mounts, with a mounting slot formed by a pair of converging walls of the aforesaid rotating mount having a predetermined space there between that is capable of clamping between pairs of the aforesaid transparent panes photographs, pictures, compact disks (CD), or optical disks, thereby allowing the user to switch or change photographs or rotate to replace the background, or to display compact disks (CD) or optical disks.

2. An apparatus as claimed in claim 1 wherein, the aforementioned rotating mounts are U-shaped to provide mounting support, with the converging walls formed by the U-shaped contour providing the means for clamping the aforementioned transparent panes such that each pair of aforementioned transparent panes are capable of holding interchangeable said photographs, pictures, compact disks (CD) or optical disks.

3. An apparatus as claimed in claim 1 wherein, the aforementioned mounting slot is of variable dimension to accommodate the insertion of objects having different thickness.

* * * * *